(12) United States Patent
O'Neill

(10) Patent No.: US 10,880,114 B2
(45) Date of Patent: Dec. 29, 2020

(54) MERCHANT OR THIRD PARTY CONTROLLED ENVIRONMENTAL ADJUSTMENT DEVICES

(71) Applicant: PayPal, Inc., San Jose, CA (US)

(72) Inventor: Megan Marie O'Neill, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 262 days.

(21) Appl. No.: 16/020,899

(22) Filed: Jun. 27, 2018

(65) Prior Publication Data

US 2020/0007354 A1   Jan. 2, 2020

(51) Int. Cl.
| | |
|---|---|
| *H04L 12/28* | (2006.01) |
| *H05B 47/175* | (2020.01) |
| *G05D 23/19* | (2006.01) |
| *G06Q 30/02* | (2012.01) |
| *G06Q 30/06* | (2012.01) |
| *H04L 29/08* | (2006.01) |
| *H05B 47/18* | (2020.01) |

(52) U.S. Cl.
CPC ....... *H04L 12/282* (2013.01); *G05D 23/1917* (2013.01); *G06Q 30/0239* (2013.01); *G06Q 30/0641* (2013.01); *H05B 47/175* (2020.01); *H04L 67/125* (2013.01); *H04L 2012/285* (2013.01); *H04L 2012/2841* (2013.01); *H05B 47/18* (2020.01)

(58) Field of Classification Search
None
See application file for complete search history.

(56) References Cited

U.S. PATENT DOCUMENTS

| 8,505,054 B1 * | 8/2013 | Kirley | H04N 21/436 725/74 |
| 8,700,772 B2 * | 4/2014 | Saint Clair | H04L 67/32 709/225 |
| 9,766,691 B1 * | 9/2017 | Johansson | G06F 1/3287 |
| 10,075,828 B2 * | 9/2018 | Horton | G05D 23/1917 |

(Continued)

OTHER PUBLICATIONS

Mannweiler, B., et al., "Context-Aware Smart Environments Enabling New Business Models and Services," 2010-ITU-T Kaleidoscope: Beyond the Internet?—Innovation for Future Networks and Services, pp. 1-7, Dec. 1, 2010. (Year: 2010).*

(Continued)

*Primary Examiner* — Nicholas D Rosen

(74) *Attorney, Agent, or Firm* — Haynes and Boone, LLP

(57) ABSTRACT

Methods and systems are provided to allow for merchant or third party controlled adjustment of a physical environment around a user. Such adjustments may be in response to user actions and may create a more immersive experience for the user. Such adjustments may be determined from interaction data received from a user device, with may identify a service provider, a product, or an activity that the user is currently engaging in or is interested in. One or more secondary devices may be identified to be within an area around the user device and one or more environmental rules associated with the service provider, product, or activity may be determined and communicated to the one or more secondary devices to cause the one or more secondary devices to adjust a physical environment of the area proximate the user device.

20 Claims, 9 Drawing Sheets

(56) References Cited

U.S. PATENT DOCUMENTS

| | | | |
|---|---|---|---|
| 10,152,738 B2* | 12/2018 | Jouhikainen | G06F 16/9537 |
| 10,365,620 B1* | 7/2019 | Raeber | H04L 12/282 |
| 10,505,754 B2* | 12/2019 | Lewis | H04L 67/18 |
| 2007/0219866 A1* | 9/2007 | Wolf | G06Q 30/00 |
| | | | 705/14.43 |
| 2009/0083374 A1* | 3/2009 | Saint Clair | H04N 7/147 |
| | | | 709/203 |
| 2012/0239205 A1* | 9/2012 | Frerking | G05D 23/1934 |
| | | | 700/276 |
| 2014/0164122 A1* | 6/2014 | Wissner-Gross | |
| | | | G06Q 30/0261 |
| | | | 705/14.58 |
| 2016/0261425 A1* | 9/2016 | Horton | H04L 12/2818 |
| 2017/0006335 A1* | 1/2017 | Patel | H04N 21/4622 |
| 2018/0182010 A1* | 6/2018 | Jouhikainen | G06F 16/9537 |
| 2019/0097826 A1* | 3/2019 | Lewis | H04L 67/306 |

OTHER PUBLICATIONS

Anon., "Samsung Reveals Entire 2016 Smart TV Line-up Will Be IoT Ready," M2 Presswire, Jan. 5, 2016. (Year: 2016).*

Anon., "WSO2 Announces Repositioning of its Open Source Products to Drive Digital Transformation Agility at WSO2Con User Conference", ICT Monitor Worldwide [Amman], Feb. 21, 2017. (Year: 2017).*

* cited by examiner ent of physical environmental parameters around a user. One or more conditions that indicate that adjustment of physical environmental parameters around the user may be detected. Based on the conditions, instructions for adjusting the physical environmental parameters may be provided to one or more secondary devices around the user that can adjust one or more physical environmental parameters. Such physical environmental parameters may include noises, sounds, music, scents, lighting, temperature, and other parameters. Such techniques or methods may be performed without input or with minimal input (e.g., with only preferences and location data provided) from the user. In certain embodiments, the user may not have direct control (e.g., may not be able to determine the exact settings of the adjustments) over the adjustment of the physical environmental parameters or may have only minimal control (e.g., the user may determine whether adjustment is allowed or not). Instead, the third party may control such adjustments.

MERCHANT OR THIRD PARTY CONTROLLED ENVIRONMENTAL ADJUSTMENT DEVICES

BACKGROUND

Field of the Invention

The present invention generally relates to adjusting physical environmental parameters with secondary devices, and more particularly, to adjusting the physical environmental parameters through rules determined based on interactions on user computing devices, according to various embodiments.

Related Art

Physical environments, such as an office, a car, or a room in a house, can be controlled through lights, thermostats, and the like. Conventionally, parameters, such as temperature, and lighting conditions, are controlled manually by the user, for example requiring the user to go to the light or thermostat and adjust to the desired setting. More recently, with the Internet of Things (IoT), such parameters can be controlled through an application on a user computing device or other central control. Thus, users can more easily control their environment and an intended use or condition, which typically has been for the user's comfort. However, with the ability to control physical environmental parameters, this technology can be expanded to provide additional benefits not currently known.

Figure 1:
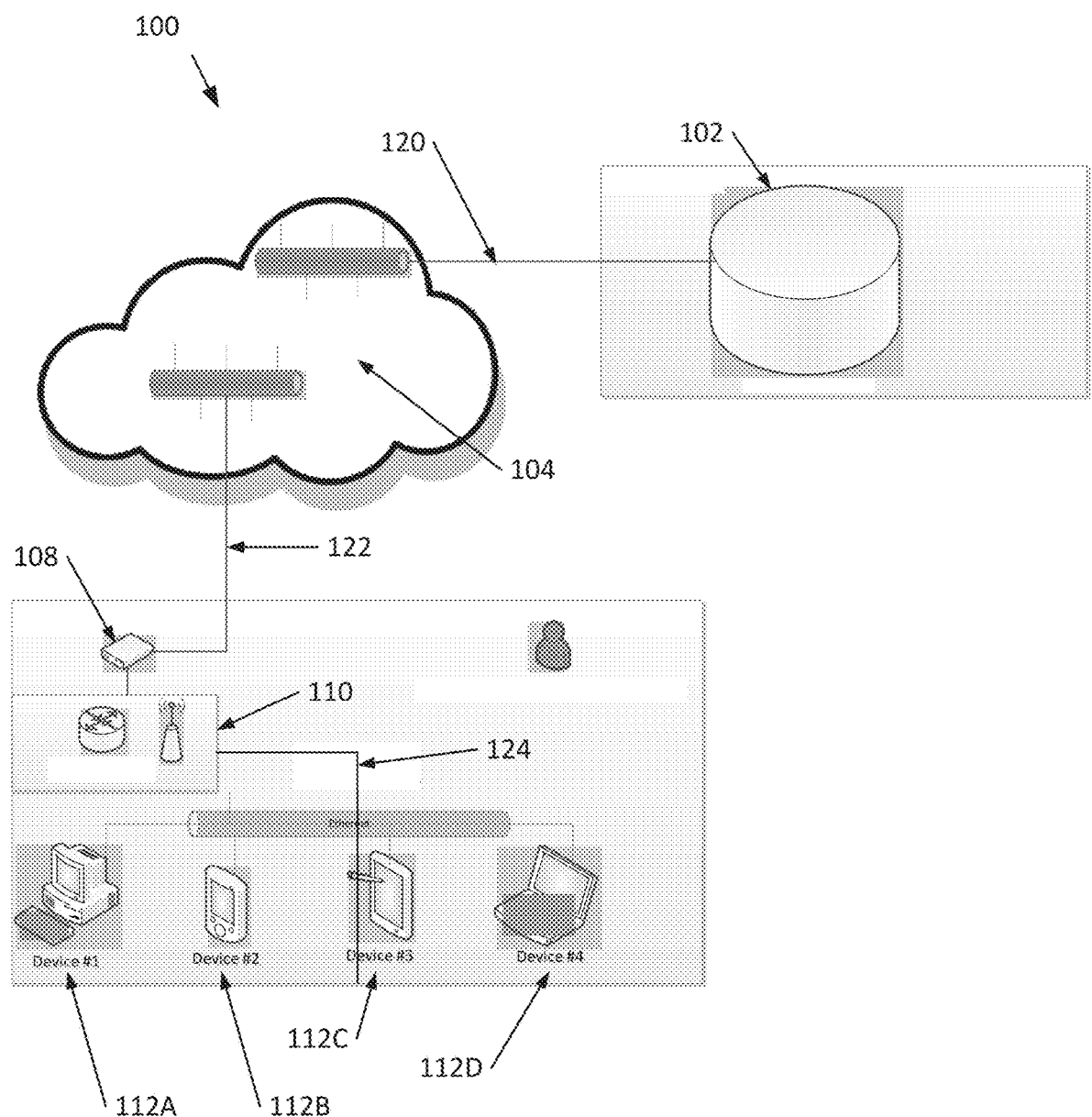
FIG. 1 is a schematic diagram showing a system according to an embodiment of the disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Commerce, such as shopping, is shifting from a brick and mortar store based experience to an online experience. However, online shopping experiences are generally limited to what the user device is able to display. Thus, traditional techniques of creating a brand based on an immersive shopping experience through a physical experience is lost in the online environment. Furthermore, each user may respond to physical experiences differently. Traditional techniques of creating such a physical environment do not allow for variations between user preferences.

The present disclosure describes systems and methods that allow a third party (e.g., a merchant and/or a third party management system) to adjust physical environmental parameters around a user. One or more conditions that indicate that adjustment of physical environmental parameters around the user may be detected. Based on the conditions, instructions for adjusting the physical environmental parameters may be provided to one or more secondary devices around the user that can adjust one or more physical environmental parameters. Such physical environmental parameters may include noises, sounds, music, scents, lighting, temperature, and other parameters. Such techniques or methods may be performed without input or with minimal input (e.g., with only preferences and location data provided) from the user. In certain embodiments, the user may not have direct control (e.g., may not be able to determine the exact settings of the adjustments) over the adjustment of the physical environmental parameters or may have only minimal control (e.g., the user may determine whether adjustment is allowed or not). Instead, the third party may control such adjustments.

For the purposes of this disclosure, "secondary device" may refer to devices that allow for adjustment of a physical environmental parameter. Such secondary devices may be connected to a user device associated with the user or to a network. In certain embodiments, the secondary device may connect to the user device and detect the presence of the user device in an area around the secondary device.

In certain embodiments, the user device, one or more of the secondary devices, or another device such as a server device may determine that conditions are met to adjust physical parameters around the user device. Thus, for example, the user device may include one or more applications that can determine when such conditions are met and provide instructions to adjust physical parameters to the user device itself or to secondary devices. Such conditions may be determined from input received by one or more of the user device or the secondary devices. In certain such embodiments, user control of such applications may be eliminated or minimized and the application itself, rather than user inputs or settings, may determine when the conditions are met.

In certain embodiments, the systems and techniques of the present disclosure allow for improvements in the operation of computer systems. For example, the systems and techniques of the present disclosure may improve online shopping experiences by allowing for adjustment of a physical environment around the user. In certain embodiments, the systems and techniques described herein may allow for third parties to adjust the physical environment around the user using secondary devices. Multiple secondary devices may be connected into a network to adjust the physical environment. The creation of such a network may allow for a third party to provide a more personalized physical experience for the user directed to specific content the user is engaged in within the physical environment through the user device.

Adjustment of the physical environment may include adjusting lighting, providing a scent, changing the humidity, changing the temperature, providing sounds, and/or providing or changing another aspect of the environment. In certain embodiments, the adjustment of the physical environment may also include interactions with the user, such as providing a massage to the user and/or receiving and responding to feedback from the user.\

In certain embodiments, the user device, the secondary devices, and/or a server device may determine that conditions for adjustment of physical parameters have been met.

The user device and/or the server device may, thus, receive signals or inputs from the user device and/or the secondary device and provide instructions to adjust the physical parameters. In certain embodiments, the user device and/or the server device may additionally receive signals or inputs from the user device and/or the secondary device during adjustment of the physical parameters. Such inputs may allow for determination of user reactions and other reactions to the adjustment, and the instructions to adjust the physical parameters may be modified in response to the reactions, further personalizing the experience. Furthermore, such modified responses may be used in future environmental adjustments. Thus, such future adjustments may be personalized for the user.

Additionally, the presence or absence of certain types of secondary devices may also be detected. The systems and techniques described herein allow for improvement of operation of electronic devices by allowing for variation of operation of secondary devices based on the determination of the presence or absence of certain devices and thus provide a more customized physical experience while, for example, compensating for the absence of certain types of devices. Thus, operational flexibility of systems utilizing such devices may be improved as operation of the devices may be adjusted according to conditions.

Furthermore, the systems and techniques may allow for conservation of processing resources by, for example, allowing for the detection of the presence of a passive user device within an area and adjusting the physical parameters of the area without input from the user device. Thus, no affirmative action is required of the user device, conserving battery life and processing resources of the user device.

FIG. 1 is a schematic diagram showing a system according to an embodiment of the disclosure. While FIG. 1 describes certain components and systems to perform the techniques described herein, it is appreciated that other embodiments may include additional components, may include fewer components, or may include other components.

FIG. 1 shows a device identification system 100 that includes a management system 102, a communications system 104, a network 108, a router 110, and devices 112A-D. The management system 102 may be communicatively connected to communications device 104 via a communications path 120. Communications path 122 may communicatively connect communications system 104 to network 108. The network 108 may be communicatively connected to router 110 and router 110 may be communicatively connected to devices 112A-D via communications path 124.

Devices 112A-D may include one or more user devices and one or more secondary devices. The presence of the user device may be detected by the secondary devices, by router 110, through network 108, or through other techniques (e.g., by communication of position data directly from the user device to management system 102). The secondary devices may adjust a physical parameter of the area around the user device. While the embodiment shown in FIG. 1 illustrates a configuration where all devices 112A-D first connect to router 110 before then connecting to management system 102, other embodiments, such as the embodiments of FIGS. 3A-3C, may allow for each device or one or more devices to individually connect to the management system.

Devices 112A-D may be, for example, a smartphone, a personal data assistant, a tablet, a wearable electronic device (such as a smartwatch or electronically augmented glasses), a laptop, a desktop, a speaker, a diffuser, a fog machine, a light, a massage chair, a massager, a server, or other electronic device that may receive inputs and/or provide outputs. One or more of the devices 112A-D may include user interfaces that may include a combination of one or more display screens, data entry devices such as a keypad or touch screen, buttons, facial or movement recognition abilities, or other items that allow a user to interface with one or more of the devices 112A-D.

Management system 102 may be configured to receive information (e.g., from the user device, from the secondary device, from one or more devices within the network, or from other devices) to determine a user interaction with a merchant. Such user interactions may include the user browsing a website of a merchant with the user device, the presence of the user device within an area, such as a store or hotel, associated with the merchant, through voice commands from the user indicating interest in the merchant, or through other techniques. Management system 102 may be controlled by the merchant or by a third party management system.

Communications between the various systems described herein may be via one or more communications paths. The communications paths 120, 122, and 124, as well as other communication paths described herein, may be wired and/or wireless internet communications such as wired internet, broadband, satellite, Bluetooth, WiFi, NFC, 4G LTE or other data connections, phone and fax enabled communications, as well as other techniques of communications between devices.

Figure 2A:
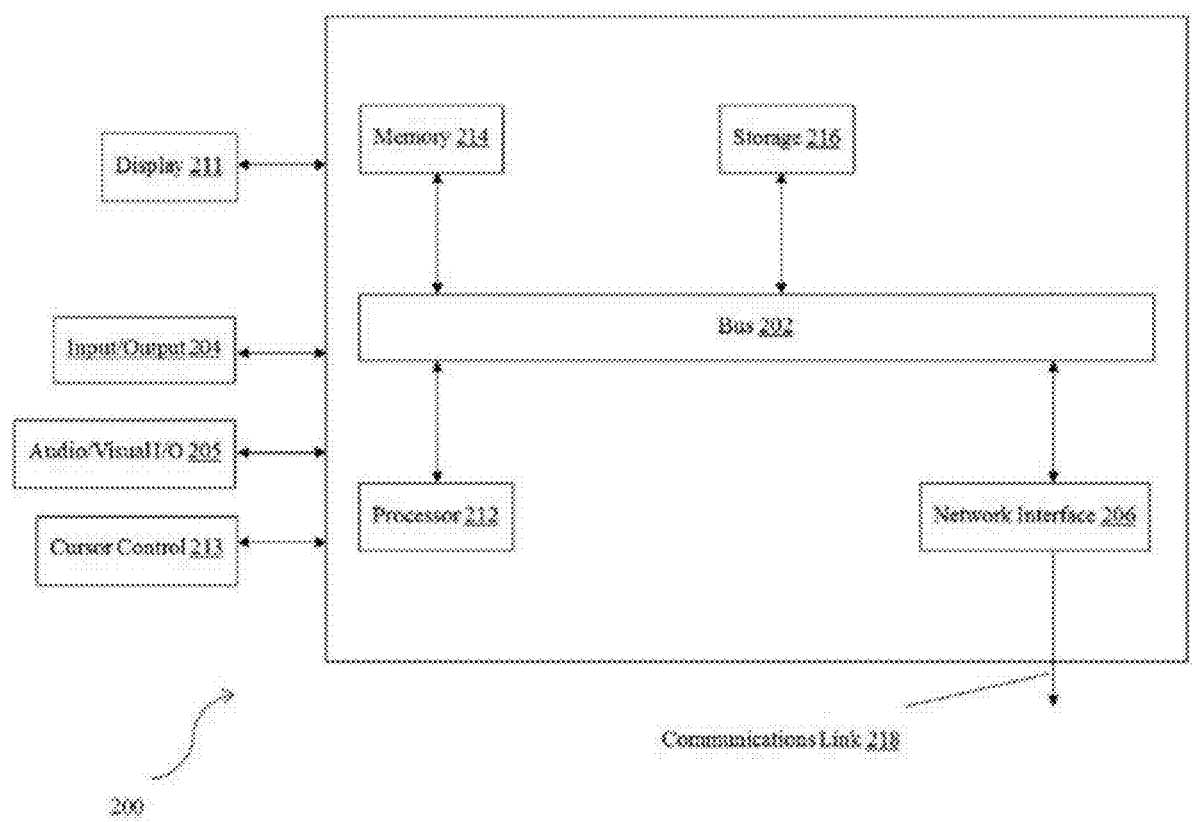
FIG. 2A is a block diagram showing an example device according to an embodiment of the disclosure.

FIG. 2A is a block diagram showing an example device according to an embodiment of the disclosure. The device of FIG. 2A may be an electronic device such as a user device, secondary device, or server device. The electronic device of FIG. 2 may utilize a network computing device (e.g., a network server) and communicate data over the network. It should be appreciated that each of the devices utilized by users, merchants, management systems, or other parties may be implemented as electronic device 200 in a manner as follows.

Electronic device 200 includes a bus 202 or other communication mechanism for communicating information data, signals, and information between various components of electronic device 200. Components include an input/output (I/O) component 204 that can receive or output data. I/O component 204, which may be comprised of multiple devices, may also include an output component, such as a display 211 and a cursor control 213 (such as a keyboard, keypad, mouse, etc.). An optional audio input/output component 205 may also be included to allow a user to use voice for inputting information by converting audio signals. Audio I/O component 205 may receive audio singles (e.g., sound waves emitted by people or devices that are nearby). A transceiver or network interface 206 transmits and receives signals between electronic device 200 and other devices, such as another electronic device, service device, or a server via network 180. In one embodiment, the transmission is through wired or wireless communications techniques, although other transmission mediums and methods may also be suitable. One or more processors 212, which can be a micro-controller, digital signal processor (DSP), or other processing component, processes these various signals, such as for display on electronic device 200 or transmission to other devices via a communication link 218. Processor(s) 212 may also control transmission of information, such as cookies or IP addresses, to other devices.

Components of electronic device 200 may also include a system memory component 214 (e.g., RAM), a static storage component 216 (e.g., ROM), and/or a disk drive 217. Electronic device 200 performs specific operations by processor(s) 212 and other components by executing one or more sequences of instructions contained in system memory component 214. Logic may be encoded in a computer readable medium, which may refer to any medium that participates in providing instructions to processor(s) 212 for execution. Such a medium may take many forms, including but not limited to, non-volatile media, volatile media, and transmission media. In various embodiments, non-volatile media includes optical or magnetic disks, volatile media includes dynamic memory, such as system memory component 214, and transmission media includes coaxial cables, copper wire, and fiber optics, including wires that comprise bus 202. In one embodiment, the logic is encoded in a non-transitory computer readable medium. In one example, transmission media may take the form of acoustic or light waves, such as those generated during radio wave, optical, and infrared data communications.

Figure 2B:
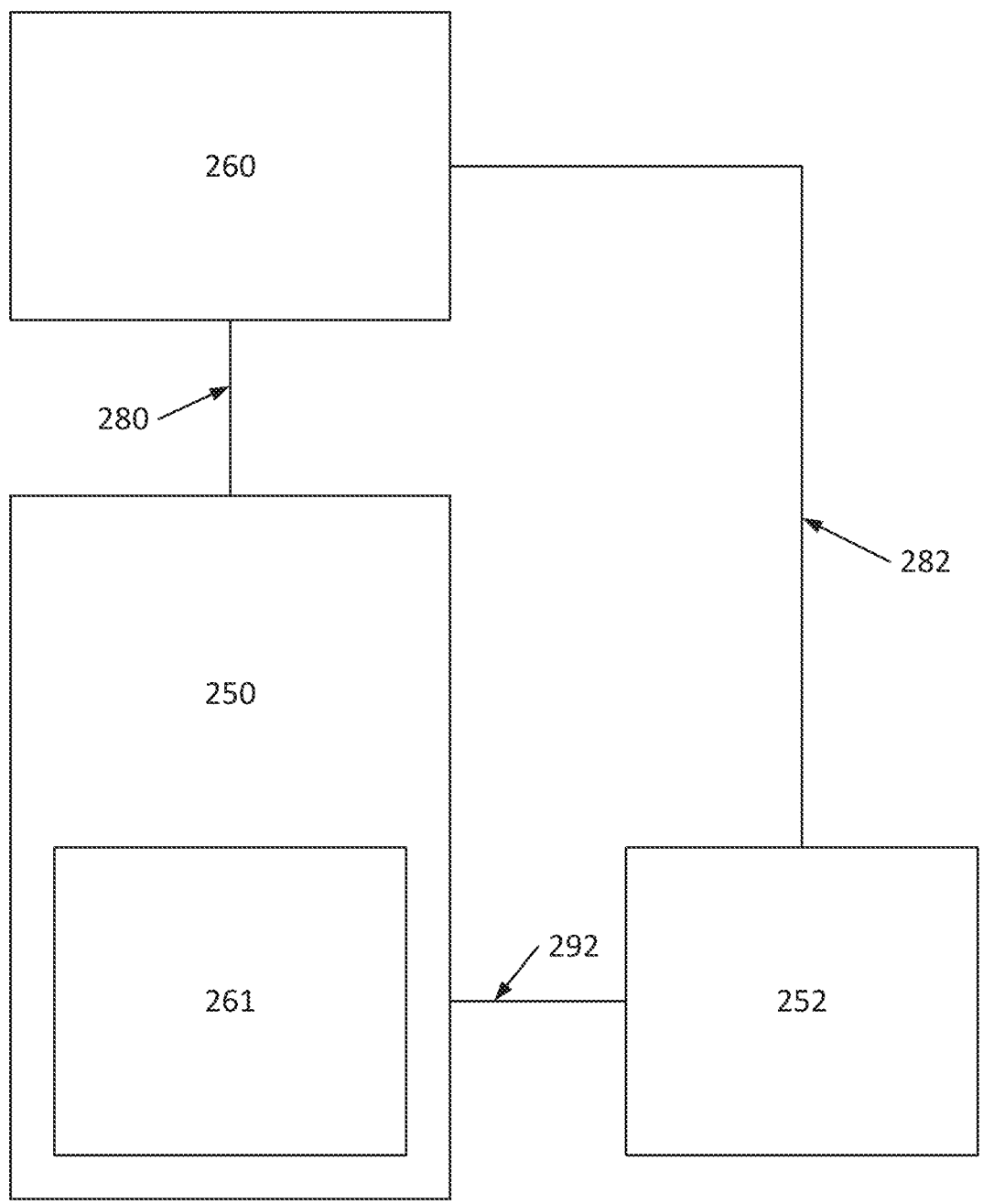
FIG. 2B is a block diagram showing an example system according to an embodiment of the disclosure.

FIG. 2B is a block diagram showing an example system according to an embodiment of the disclosure. FIG. 2B illustrates user device 250, management system 260, and secondary device 252. User device 250 is communicatively connected to management system 260 through communication path 280 and to secondary device 252 through communication path 292. Secondary device 262 is currently communicatively connected to management system 260 through communication path 282.

User device 250 may include application 261. Application 261 may be locally stored on user device 250 and may receive data from sensors and applications of user device 250 (as well as secondary device 252 and management system 260). In certain embodiments, application 261 may receive data from sensors and applications of user device 250, such as data from local browsers, local sensors, local applications, and/or local positioning systems, without using cloud computing, to determine an intent of the user (e.g., a purchasing intent of the user) and whether environmental parameters should be adjusted. Application 261 may then continuously receive data from one or more sensors or other applications of user device 250 (e.g., from a web browser of user device 250).

Application 261 may receive data indicating that the user of user device 250 is about to initiate a transaction. For example, data from the web browser may indicate that the user is browsing a site offering purchase of a product or a service and application 261 may include data indicating that, while the user may only casually browse sites, the user's "seriousness" of purchase increases when the user dims the lights. For example, user device 250 may include a light sensor and data stored by user device 250 may indicate that 80% of the user's total purchases when using the web browser are made when a light sensor indicates that the environment around the user is dimmed or dark. Application 261 may receive data from the light sensor indicating that the user has dimmed the lights in the room and thus determine that a likelihood of purchase is higher for the user.

Additionally, application 261 may provide instructions to and receive sound data from secondary device 252, which may include a speaker and microphone. Application 261 may store data that indicates that 75% of transactions of the user are made when there is no background music. As application 261 has determined that data from the light sensor indicates that the lights are dimmed and, thus, the user is seriously shopping, application 261 may additionally provide instructions to turn off background music.

Furthermore, application 261 may receive data from the sensors and applications of user device 250 and secondary device 252 while, for example, the user continues to browse the site offering purchase of the product or service. Application 261 may then modify instructions to adjust environmental parameters based on data received, as described herein, or may provide data for the transaction. Thus, application 261 may determine that, according to stored data, the user prefers to use credit card A when lights are dimmed and credit card B when lights are turned on. Application 261 may then determine, from data from the light sensor, that the lights continue to be dimmed and may thus pre-load payment data for credit card A for the transaction.

In certain embodiments, the user may utilize a plurality of user devices. In such embodiments, application 261 may provide or receive data from one or more other applications of other user devices. The other user devices may be located proximate user device 250 and the applications of the plurality of user devices may be linked to determine conditions for and/or adjust the environmental parameters.

Figure 3A:
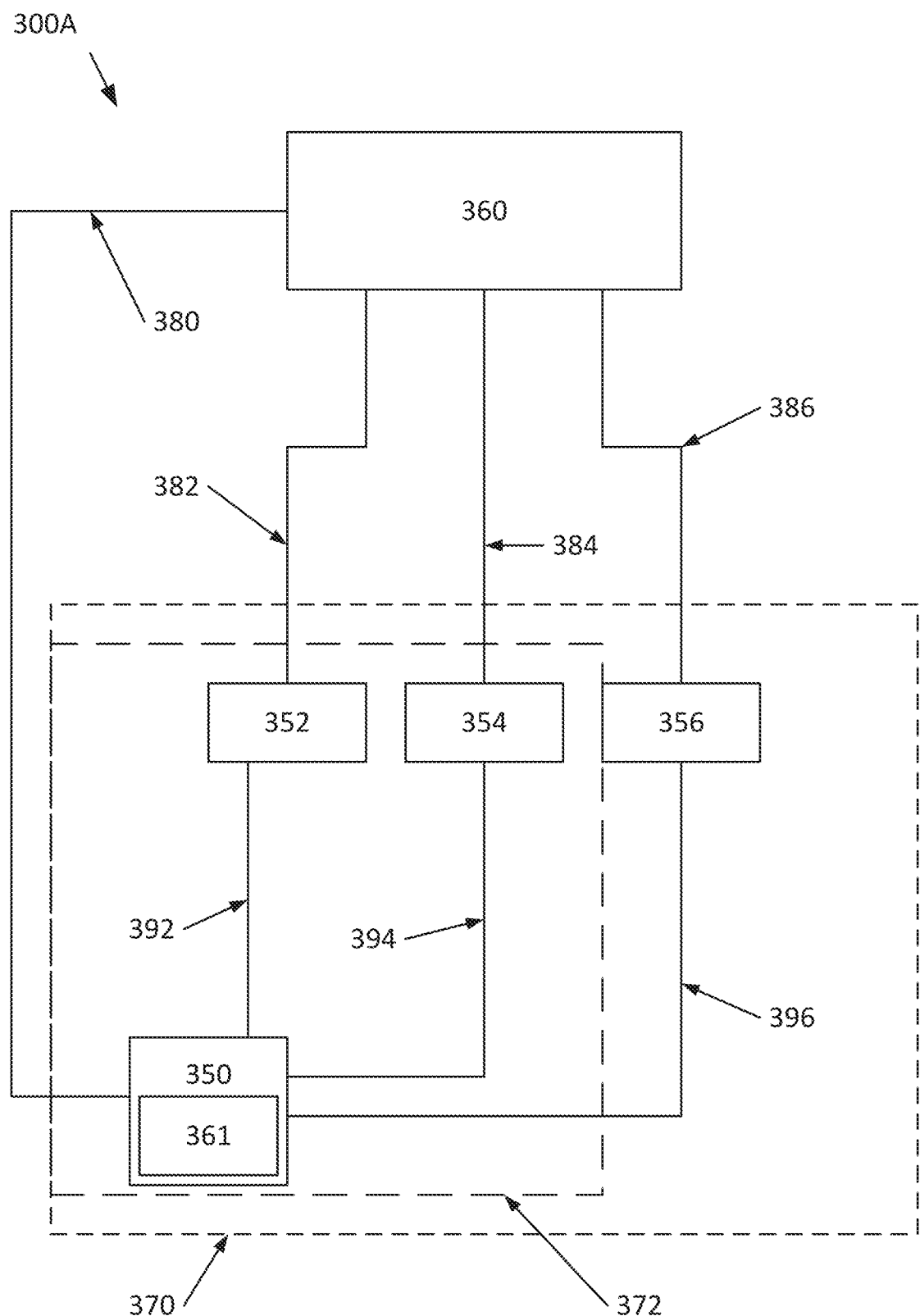
FIGS. 3A-3C are block diagrams showing example environmental parameter adjustment systems according to embodiments of the disclosure.
Figure 3B:
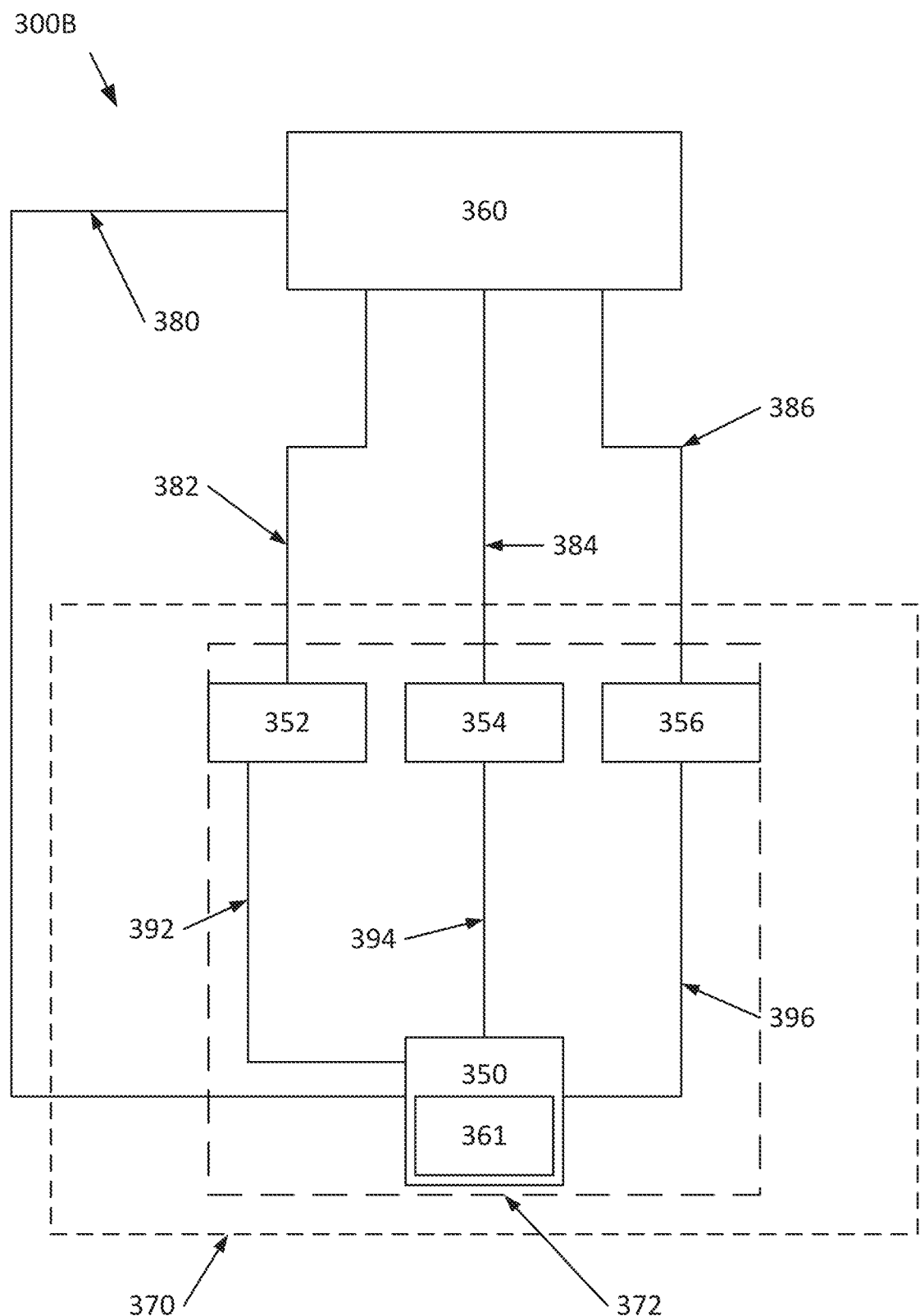
Figure 3C:
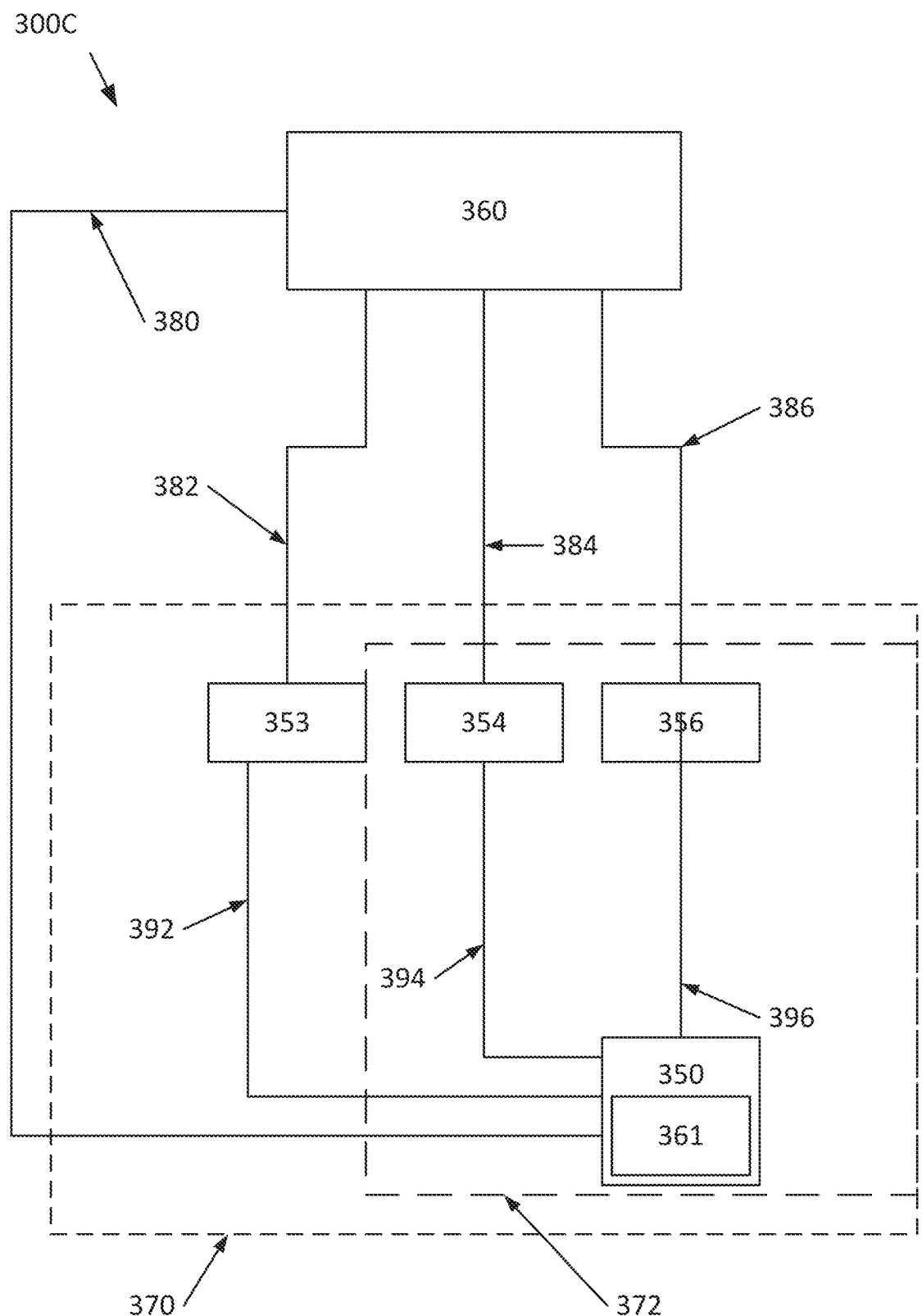

FIGS. 3A-3C are block diagrams showing example environmental parameter adjustment systems according to embodiments of the disclosure. FIGS. 3A-3C illustrate interactions between management system 360, user device 350, and secondary devices 352-356. User device 350 and secondary devices 352-356 may be any type of electronic device described herein. Thus, for example, user device 350 and secondary devices 352-356 may be one or more of a smartphone, a personal data assistant, a tablet, a wearable electronic device (such as a smartwatch or electronically augmented glasses), a laptop, a desktop, a speaker, a diffuser, a fog machine, a light, a massage chair, a massager, a server, or other electronic device that may receive inputs and/or provide outputs. User device 350 may include application 361. Application 361 may be configured to determine if conditions to adjust environmental parameters are met, provide environmental rules for adjusting the parameters, determine if there should be modifications for the environmental rules to adjust the environmental parameters, and determine if transactions should be manipulated based on environmental conditions detected.

Secondary devices 352-356 may be configured to adjust an environmental parameter around user device 350 through rules received from user device 350 and/or management system 360. Thus, secondary devices 352-356 may be configured to, for example, provide/adjust lighting, scents, humidity, sounds, temperature, and/or any other aspects of the physical environment.

Management system 360 may be an electronic device or a server device configured to provide instructions to user device 350 and/or secondary devices 352-356. In certain embodiments, application 361 and/or management system 360 may be controlled by a service provider (e.g., a merchant, a reseller, a hotel, a restaurant or coffee shop, or another party that the user would directly interact with) or a third party (e.g., a third party responsible for providing physical experiences for shoppers for a service provider). Thus, various embodiments may utilize one or both of management system 360 or application 361 to determine and provide rules associated with the environment around user device 350.

User device 350 and secondary devices 352-356 are communicatively connected to management system 360 via communication paths 380-386, respectively. Furthermore, user device 350 may be communicatively connected to secondary devices 352-356 via communication paths 392-

396, respectively. The communication paths may be any type of communication technique that allows for wired or wireless communication between electronic devices.

In a certain embodiment, management system 360 or application 361 may determine that a user may be interacting with a service provider, interested in a product or service of the service provider, receiving an item or service provided by the service provider, and/or engaging in an activity provided by the service provider (e.g., the service provider is a gym and the user has entered a gym location of the service provider). For example, the user, using user device 350, may be browsing a webpage of the service provider (e.g., viewing one or more products from the service provider's website). In other embodiments, location data received from user device 350 may indicate that the user is in a store or other establishment of the service provider, or the user may be checking into an establishment owned by the service provider via a web browser of user device 350. Certain embodiments may automatically adjust environmental parameters (e.g., for a better user experience), while other embodiments may first receive a user input indicating user interest in adjusting environmental parameters. In certain such embodiments, the user input may be an affirmative input (e.g., requesting the adjustment through operation of user device 350, through voice commands, or through another input technique) or may be an implied input (e.g., if the user browses to a webpage allowing for an immersive experience of the product).

In certain embodiments, management system 360 or application 361 may first determine that, in addition to interacting with the service provider, the user or user device 350 may be located in first area 370. First area 370 may be an area designated or appropriate for adjustment of environmental parameters (e.g., the user may designate certain areas of the user's residence or the service provider may designate only certain areas of a store as areas appropriate for adjustment of environmental parameters). Examples of first area 370 include an office, a room of a house, a room in a hotel, or any other physical location where a user may interact with user device 350 by himself or herself. In other examples, the location may be where the user may interact with user device 350 in the presence of others, but may be limited to not exceed a certain number of other users at the time of use. In certain parameters, management system 360 or application 361 may determine if first area 370 is appropriate by, for example, determining that no other users or devices of other users are present within first area 370 (e.g., there is no WiFi and/or Bluetooth signal of such devices) or determining that no other users are present through audio data received from user device 350 or secondary devices 352-356 (e.g., management system 360 or application 361 may store a voice trace of the user and determine, from audio data received by the devices, whether there are human or animal sounds distinct from the voice trace of the user).

Management system 360 or application 361 may then determine the presence of one or more secondary devices within a second area 372 around user device 350 that is appropriate for environmental parameter adjustment. Second area 372 may be an area where environmental adjustments by secondary devices may be detected by the user or user device 350, or may be an area where environmental adjustments may not affect other people, animals, or other objects around user device 350. Thus, while second area 372 in certain embodiments may be an area of a preset size or shape, other embodiments may adjust second area 372 depending on feedback (e.g., if management system 360 or application 361 detects one or more other people or animals nearby, management system 360 or application 361 may adjust second area 372 to not affect the other people or animals) or based on the detected environment (e.g., management system 360 or application 361 may set second area 372 to be the size of the room that contains user device 350). Second area 372 may be part of or within first area 370.

In certain embodiments, management system 360 or application 361 may receive location data (e.g., global positioning, triangulation, or other data) from user device 350 and environmental rules may be determined according to location data. The location data may indicate that the user is within a specific geographic location, such as the user's home, a store of a merchant's, or a library, or may indicate that the user is within a general location. The environmental rules may accordingly be determined based on the location data. Thus, certain users may have a setting where, if they are in more temperate areas, such as Washington state, adjustment of the environment around them to more closely mimic a forest is desired.

Management system 360 or application 361 may also receive interaction data that may, for example, identify a user interaction with the service provider. The interaction data may also identify a product of the service provider that the user has purchased or is interested in. Further, management system 360 or application 361 may also receive data from secondary devices 352-356, such as secondary device data identifying one or more secondary devices located in an area (e.g., second area 372) proximate the user device.

In certain embodiments, interaction data may be received from one or more of the secondary devices 352-356. For example, the user may enter a store, coffee shop, or hotel room and user device 350 may communicate that the user is interested in a product to a secondary device within the store, or a secondary device may detect the presence of user device 350 within the coffee shop or hotel room. The secondary device may then determine that user device 350 is in the store because the user is interested in purchasing an item, that user device 350 is in the coffee shop because the user is interested in purchasing a coffee, or that the user has entered the hotel room as the user has a booking. The secondary device, which may be connected with other devices, may then communicate interaction data to management system 360 or application 361 and request environmental rules.

Additionally or alternatively, certain other embodiments may be configured to have management system 360 or application 361 receive data from user device 350 and/or secondary devices 352-356 in other configurations. For example, one or more secondary devices 352-356 may be configured to determine the presence of user device 350 within first area 370 or second area 372 and may transmit data indicating such to management system 360 or application 361. The secondary devices 352-356 may also transmit data to management system 360 or application 361 identifying whether they are within or outside first area 370 and/or second area 372 according to the position of user device 350. Other embodiments may utilize user device 350 to detect the presence of secondary devices 352-356 within first area 370 or second area 372.

Thus, management system 360 or application 361 may determine that user device 350 is within first area 370 and may receive interaction data indicating that a condition for adjusting the environment has been met (e.g., that the user of user device 350 is interested in or has purchased a product of or is within an establishment of a merchant that management system 360 or application 361 is associated with). Management system 360 or application 361 may then determine the presence of one or more secondary devices within second area 372. Management system 360 or application 361 may, for example, compare the location data of user device 350 and secondary devices 352-356 to determine which of secondary devices 352-356 are located within second area 372. Management system 360 or application 361 may receive such location data from user device 350, secondary devices 352-356, and/or through one or more other devices (e.g., from a router that user device 350 and/or secondary devices 352-356 are connected to). While second area 372 described herein may be smaller than first area 370, other embodiments may have second area 372 be the same size as or bigger than first area 370.

Management system 360 or application 361 may then determine one or more environmental rules. Such environmental rules may be determined with, or stored within, a rules engine of management system 360 or application 361. The rules engine may be part of or in communication with a database that includes rules for a plurality of combinations of users, user devices, secondary devices, service providers, and/or other factors. For example, such an environmental rule may be based on the identity of the service provider, the product that the user is interested in or has purchased, the identity of the user, the number and type of secondary devices proximate the user device, the distance of the secondary devices from the user device, and/or other factors.

In certain embodiments, for example, the environmental rules may vary depending on the number and type of secondary devices detected. For example, in the embodiment shown in FIGS. 3A-3C, secondary device 352 may be a speaker, secondary device 354 may be a diffuser, and secondary device 356 may be a lighting source. In FIGS. 3A-3C, management system 360 or application 361 may determine that user device 350 is interacting with a first merchant (e.g., is shopping for a sundress appropriate for the beach) and is within first area 370 and thus an environmental parameter around the area of user device 350 may be adjusted to provide a better and/or more immersive experience for the user. The environmental rule may be provided to the user device 350 and/or directly to secondary devices 352-56 (e.g., via one or more communication paths 380-86) or may be provided to one or more devices and served to other devices.

In FIG. 3A, management system 360 or application 361 may determine that only secondary devices 352 and 354 are within second area 372 and may include a rule that secondary devices outside of second area 372 should not be operated to adjust the environmental parameter. Thus, management system 360 or application 361, in FIG. 3A, may provide instructions to only operate secondary devices 352 and 354.

As the user is determined to be interested in a sundress appropriate for the beach, management system 360 or application 361 may provide instructions to secondary device 352 to provide the sounds of waves. In certain such embodiments, management system 360 or application 361 may include stored tracks of sounds of waves and may provide such tracks to secondary device 352. In other embodiments, secondary device 352 may store such tracks. In further embodiments, management system 360 or application 361 may, to conserve system memory, search for and/or download tracks as appropriate or instruct secondary device 352 to search for and/or download such tracks. Management system 360 or application 361 providing such instructions to secondary device 361 to download such tracks may, thus, conserve both processing power and system memory while allowing for the environment around user device 350 to be adjusted.

Secondary device 354 may be a diffuser that includes a plurality of dispenser clips. Management system 360 or application 361 may accordingly provide instructions to secondary device 354 to provide the smells of salty spray or suntan lotion for a more enjoyable environment around user device 350. The provided instructions or secondary device 354 may include instructions to select and dispense appropriate dispenser clips to provide such smells (e.g., by combining a plurality of clips of basic smells). In certain embodiments, while application 361 may determine appropriate smells locally on user device 350, instructions for selecting and dispensing the appropriate dispenser clips may be provided by management system 360. Such a configuration may allow for user device 350, which is local and personal to the user, to determine smells according to the preferences of the user and protect the user's private data, while allowing for instructions for dispensing, which is common for all devices, to be centrally stored and accessed by a plurality of devices. Other embodiments may store such instructions on user device 350 as well, but such instructions may be stored separate from the database directed to user preferences.

Management system 360 or application 361 may be configured to provide instructions appropriate to the service provider or product that the user is interested in. Thus, management system 360 or application 361 may provide other instructions if the user device 350 is browsing other products. For example, if the user device 350 is on a webpage of a travel agency offering a vacation to Germany in winter, management system 360 or application 361 may provide instructions to secondary device 352 to provide the sounds of blowing snow or German music and to secondary device 354 to provide the smells of bratwurst and may, in other embodiments that include other secondary devices, lower a temperature of the environment around user device 350 or turn down the lights to simulate the shorter and darker days. For example, user device 350 may connect to an air conditioning unit detected to provide temperature control to the area around user device 350 and operate the air conditioning unit. In certain embodiments, user device 350 may connect to secondary devices only as appropriate and may disconnect from the devices when instructions are provided to conserve data communicated.

Returning to the example of the user interested in the sundress, in FIG. 3B, management system 360 or application 361 may determine that user device 350 has changed positions. The position of second area 372 may accordingly be changed and secondary device 356 may now also be within second area 372. Management system 360 or application 361 may detect the presence of secondary device 356 within second area 372 and provide instructions to secondary device 356 to provide white lighting to simulate a beach. In other embodiments, management system 360 or application 361 may also provide updated instructions to secondary devices 352 and/or 354 to adjust for movement of user device 350 and/or operation of secondary device 356 (e.g., if secondary device 352 is a speaker system, outputs of individual speakers may be adjusted to continue to provide a surround sound experience to the detected position of user device 350).

In FIG. 3C, management system 360 or application 361 may determine that user device 350, and thus second area 372, has again changed positions. Management system 360 or application 361 may determine that only secondary devices 354 and 356 are now within second area 372. Management system 360 or application 361 may then determine that, as secondary devices 354 and 356 are a diffuser and a lighting source, the combination of secondary devices 354 and 356 are not appropriate to adjust the environmental parameters in a manner that would improve the user's experience or immerse the user in the experience. Thus, management system 360 or application 361 may provide instructions for all secondary devices to cease operation. In certain other embodiments, management system 360 or application 361 may continue operating secondary devices 354 and 356, but may provide instructions to secondary device 352 to cease operating. Additionally or alternatively, previously provided instructions to secondary device 352 may allow secondary device 352 to detect that it is outside of second area 372 and cease operating or user device 350 may detect that secondary device 352 is outside of the area and provide instructions to secondary device 352 (based on previously provided instructions from management system 360 or application 361) to cease operating.

While the embodiments described in FIGS. 3A-3C include both first area 370 and second area 372, other embodiments may only include detecting the user device and secondary devices within one single area. Thus, in such embodiments, management system 360 or application 361 may not detect first area 370 at all and the technique may only utilize second area 372 for adjusting the environment around user device 350.

Figure 4A:
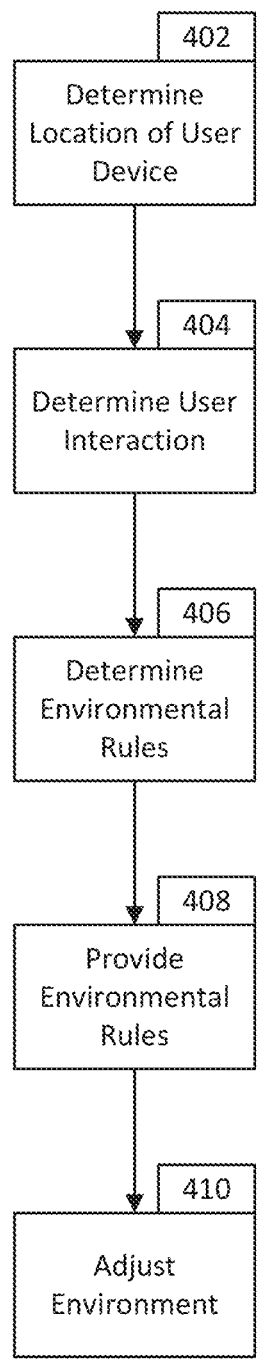
FIGS. 4A-4C are flowcharts showing example operations performed by the environmental parameter adjustment systems according to embodiments of the disclosure.
Figure 4B:
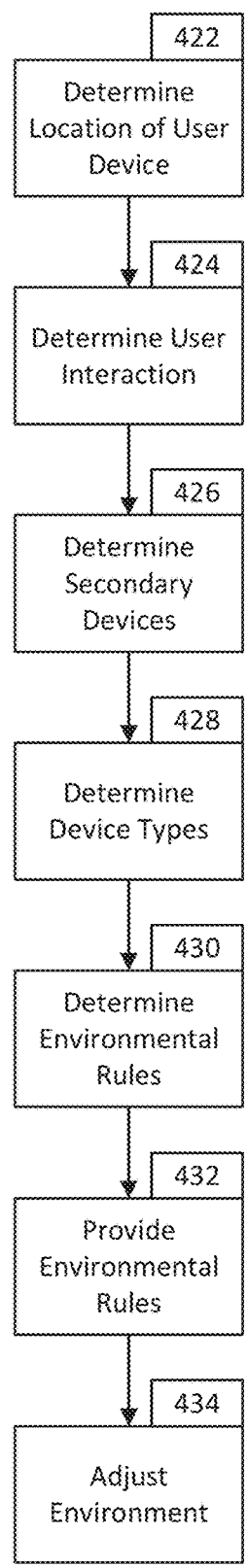
Figure 4C:
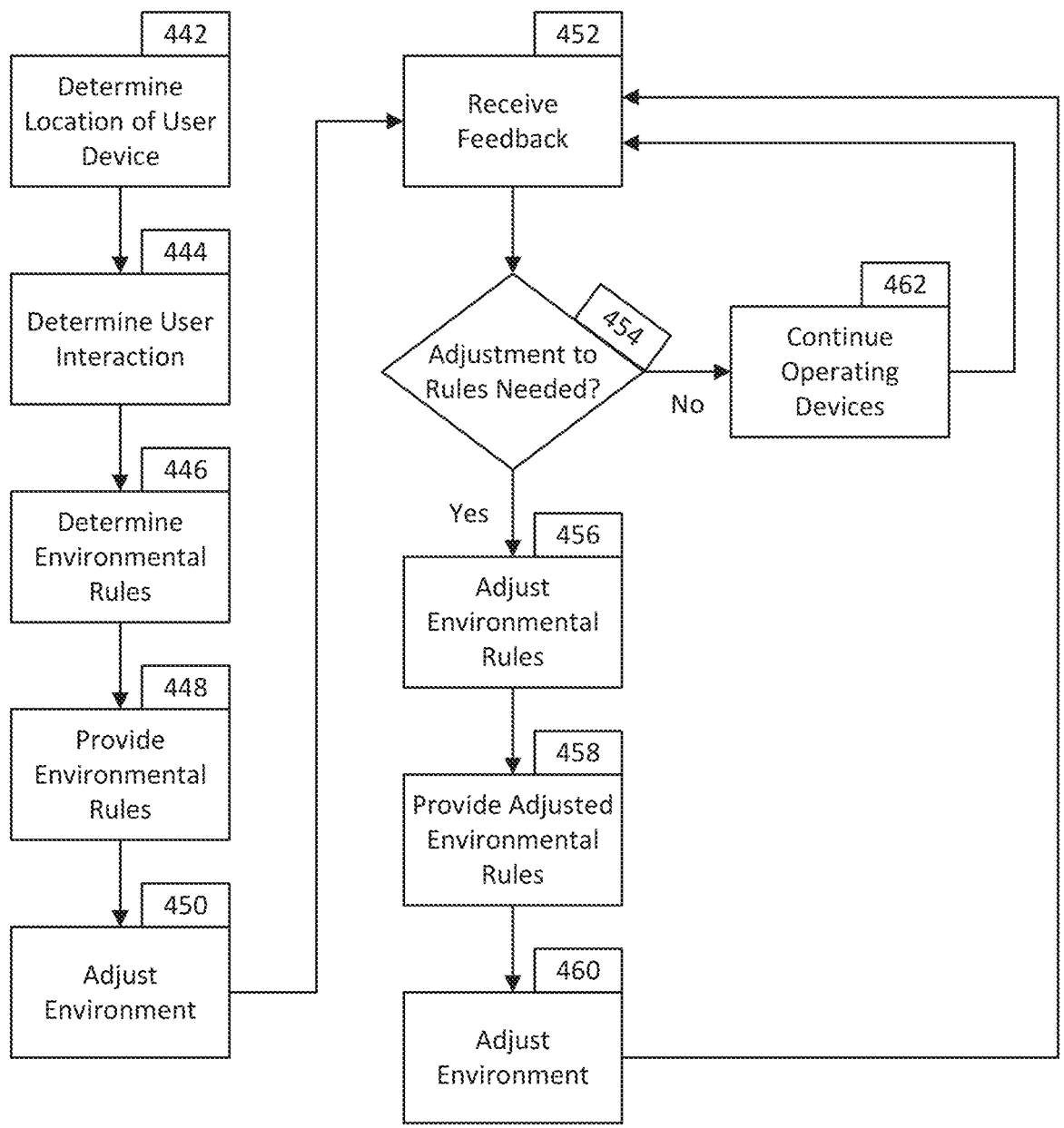

FIGS. 4A-4C are flowcharts showing example operations performed by the environmental parameter adjustment systems according to embodiments of the disclosure. In block 402 of FIG. 4A, the location of a user device may be determined. The user device may be determined to be associated with the user. The user device may be determined to be within areas where adjustment of environmental parameters may be provided. The management system and/or application of the user device may then, in response, access databases of environmental rules associated with the user.

In addition to the example of FIGS. 3A-3C, where such a location may be, for example, within a room or portion of the user's residence, such locations where adjustment of environmental parameters may be provided may, additionally or alternatively, include public areas (e.g., coffee shops or stores) or semi-public areas (e.g., hotel rooms or rental properties). Adjustment of environmental parameters within a public or semi-public area may allow the user to customize the environment around them through pre-set (e.g., from user input) or inferred (e.g., determined from user reactions) settings. Accordingly, the user may enjoy an immersive experience in, for example, a coffee shop or hotel room once the user has been detected to be in such spaces. Certain such embodiments may include receiving feedback from, for example, a microphone or vibration sensor of the user device to determine the presence or absence of people around the user and adjusting the environmental rules or the size of the affected area accordingly, to avoid disturbing others around the user.

In block 404, whether the user is interacting with service providers may be determined. Such a determination may be through the user device (e.g., through the user surfing a website or providing a voice command signaling interest in a product) or through other interactions such as detecting that the user has walked into a store. Certain embodiments of the management system and/or application of the user device may include a plurality of possible service providers, as well as a plurality of possible products. The identity of the service provider and/or product that the user is interacting with may be determined as well.

In block 406, environmental rules may be determined. Such environmental rules may provide for instructions for one or more secondary devices to adjust an environment around the user and/or user device. The environmental rules may be accessed from a rules engine and may be determined based on the identity of the user device, the user, the service provider, the product, the location, the time of day (e.g., environmental rules may only be provided for certain times of day, such as during daytime, and may not be provided for other times, such as during nighttime, to avoid disturbing others), preferences of the service provider and/or the user (e.g., certain users may not prefer music and thus music may not be provided for such users), and/or other factors. In certain embodiments, the preferences may be determined from input provided by the user or may be inferred from stored data directed to user reactions to previous environment adjustments.

For example, a physical environment may be adjusted for all users based on a determined location and content the user is accessing on the user device. However, data may be received that may then personalize the physical environment for individual users during subsequent times. For example, a certain lighting level may be provided, but user A may then increase the lighting, user B may decrease the lighting, and user C may leave the lighting as is. The level of increase or decrease may also be processed. Also, the reactions to the changes may be recorded, such as verbal noises from the user, such as "Ahh," "Nice," or a negative explicative, or physical responses, such as a more relaxed or excited state, as measured by biometrics detected through one or more user devices. Further, the end result may be determined and factored for the effectiveness of the adjustment, e.g., whether the user completed a purchase or abandoned one. Time of day and day of the year may also be a basis of the adjustment. For example, when it is rainy and cloudy outside, an environment that mimics a beach or other sunny area may be provided. As such, different users accessing the same content may be provided very different physical environments. Personalization of physical environments are further described herein.

In block 408, the environmental rules may be provided, directly or indirectly, to one or more secondary devices to adjust the environment around the user device. The environment may then be accordingly adjusted in block 410.

FIG. 4B may illustrate a further example of operations performed by the environmental parameter adjustment systems. Blocks 422, 424, 430, 432, and 434 may be similar to blocks 402, 404, 406, 408, and 410, respectively, of FIG. 4A.

In block 426, the presence of secondary devices within an area proximate the user device is determined. The secondary devices may be determined similar to the techniques described in FIGS. 3A-3C, or may be determined through other techniques (e.g., other devices, such as a camera, may be utilized to track physical location of the user, the user device, or the secondary devices).

In block 428, the types of the secondary devices detected in block 426 may be determined. The management system and/or application of the user device may, thus, communicate directly with the secondary devices or may communicate through an intermediate device such as user device and/or a router to receive data from the secondary devices that indicate a device type. In the embodiment of FIG. 4B, the environmental rules determined by the management system and/or application of the user device may at least partially be in response to the detected device types. Thus, the management system and/or application of the user device may select a certain set of environmental rules based on the detected device types.

FIG. 4C may additionally illustrate another example of operations performed by the environmental parameter adjustment systems. Blocks 442, 444, 446, 448, and 450 may be similar to blocks 402, 404, 406, 408, and 410, respectively, of FIG. 4A.

In block 452, feedback may be received. Such feedback may include feedback data received from the user device, the secondary devices, and/or another device within the vicinity of the user and may include user reaction to the environmental adjustment. For example, in a certain embodiment, a microphone of the user device, secondary device, or another device may record a verbal response from the user indicating approval or disapproval of the environmental adjustment. Such data from the microphone may then be provided to the management system and/or application of the user device and the management system and/or application of the user device may then determine, from the microphone data, whether the environmental rules should be modified (e.g., the microphone data may indicate that the user is dissatisfied with Hawaiian music provided by a secondary device and the management system and/or application of the user device may then accordingly change or eliminate the music provided).

In certain other embodiments, feedback data may include other forms of data. For example, the user may input his or her own reaction through one or more interfaces on the mobile device (e.g., by filling out a survey or directly speaking to the mobile device to indicate approval or disapproval). Other embodiments may adjust the environmental rules based on other behavior of the user. Thus, the management system and/or application of the user device may determine that the user is more responsive to dim lighting by determining that the user has a higher rate of purchase of products when dim lighting is provided and/or that biometric sensors indicate that the user is more alert through, for example, higher blood flow rate or heart rate. Thus, the management system and/or application of the user device may accordingly favor dim lighting for that particular user and provide instructions to dim the lighting around the user for more service providers and/or products, as compared to the rate of dimmed lighting for other users.

In block 454, whether the environmental rules need to be adjusted may be determined. In certain embodiments, if management system and/or application of the user device receives negative feedback from the user, on-the-fly adjustment of the environmental rules may be provided. Thus, for example, the management system and/or application of the user device may provide a feedback ranking to any user feedback received and may also adjust the ranking based on the intensity of the feedback. Accordingly, the management system and/or application of the user device may rank user feedback on a scale of −10 to +10, with −10 being the most negative and +10 being the most positive. A certain secondary device may be a camera and may record images of the user's face. A smile by the user may typically be ranked as a +3, but a large grin may be ranked +6. However, a verbal comment of "I don't like this" may be ranked a −4, and if the user is detected to get off his chair, it may be ranked a −8. The management system and/or application of the user device may be configured to only adjust the environmental rules if negative user feedback greater than −6 is detected.

In a certain example, the user may be detected to leave his chair, typically indicating that environmental rules should be adjusted. For example, the user device may include an accelerometer and accelerometer data may indicate that the user has left a sitting position. In certain embodiments, the user device may be communicatively connected to a biometric device. Such biometric devices may be a secondary device configured to detect one or more biometric signals of the user to determine user reactions. Such biometric devices may or may not be configured to adjust environment parameters. Accordingly, such biometric devices may determine, through accelerometer data, that the user has moved and determined that the biometric device has moved upward and forward and, thus, the user has left his chair.

Additionally, one or more camera equipped secondary devices may determine that the user has a smile on his face. Such a camera may include image recognition software to map a user's mouth. Such software may be included on the secondary device or the user device and may not transmit such images to the management system to protect the user's privacy.

The application of the user device may be configured to ignore the negative feedback upon detection of the smile or may be configured to sum the feedback of −8 and +3 to arrive at a feedback score of −5. As −5 is a less negative feedback score than the threshold of −6, the environmental rules may not be adjusted. However, feedback may be stored for future reference and modification or construction of future environmental rule sets.

Thus, even if environmental rules are not immediately adjusted, feedback received may be used to customize environmental rules associated with the user. For example, the user history of a user may indicate that the user favors hip hop music from, for example, the online playlist of the user. Accordingly, environmental rules may be adjusted to provide more hip hop music. Certain such embodiments may, for example, include environmental rules simulating a multitude of environments and such environments may, for music, be indicated to be "hip hop required," "hip hop optional," or "hip hop prohibited." For normal users, hip hop music may only be played for environments that are "hip hop required." However, for users that favor hip hop music, hip hop music may be played for both "hip hop required" and "hip hop optional" environments.

As another example, certain management systems and/or applications of the user devices may note verbal instances of approval or disapproval. In one such example, the management system or application of the user device may begin monitoring user actions when an environmental adjustment has commenced. The management system and/or application of the user device may receive data that signal approval or disapproval. Such data may be weighted and tabulated to determine if adjustments are needed. In certain embodiments, the weighting may change upon the user. Thus, if data indicates that the user more verbally signals approval or disapproval (e.g., through higher purchase rates or closing of browser purchases when verbal approval or disapproval, respectively, is provided) the management system and/or application of user device may provide a higher weight to such verbal data. If approval or disapproval is higher than a threshold amount, the environmental rules may be accordingly modified. Such modified rules may then be provided to the secondary devices.

As an additional example, certain environmental rules can be modified based on user preferences, even if such modifications may request in an experience different from the real-world experience that it is based. Thus, a user may be noted to continuously set his humidifier so that his room has high humidity via sensors of the user device and/or the secondary device or through settings provided to the user device from the humidifier through a communicative connection between the user device and the humidifier. The management system and/or application of the user device may then infer that the user generally prefers a humid environment. Accordingly, when the user is browsing a website for a winter getaway, the humidifier may still be operated to provide a humid environment even though snowy environments are dry. Further, if the user does book such a getaway, the lodgings of the user may be configured to provide a more humid room once the user has been detected to enter the room.

Accordingly, environmental rules can be adjusted, in real-time or for future instances, through a variety of techniques. If environmental rules do not need to be adjusted, the technique may proceed to block 462 and the devices may continue operating. However, if the environmental rules do need to be adjusted, the technique may proceed to block 456.

In block 456, the environmental rule is adjusted. In certain embodiments, the management system and/or application of the user device may attempt to determine which of the adjustments the user likes or dislikes. The adjustments that the user likes may then be amplified and the adjustments that the user dislikes may be diminished or eliminated. The management system and/or application of the user device may only amplify, diminish, or eliminate adjustments where the user feedback exceeds a certain threshold. In certain situations, if adjustments are unacceptable from an experience point of view or if the environmental adjustments are very poorly received by the user (e.g., through a feedback score of −10), the management system and/or application of the user device may instruct all secondary devices to cease operating and affecting the environment around the user.

Accordingly, in certain such embodiments, the management system and/or application of the user device may process such adjustments through logic that determines whether such adjustments are acceptable for the experience that the service provider wishes to convey. If the adjustments are unacceptable, the adjustments may not be performed. Thus, a hotel operator located within the Alps may mandate that fresh mountain air scent must be provided, or else no environmental adjustments may be performed. Other embodiments, such as embodiments where the user may input their own preferences, may also determine whether modifications to the environmental rules allow for an acceptable experience and, if they do not allow for an acceptable experience, may not communicate environmental rules at all.

In block 458, the adjusted environmental rules are provided to the secondary devices, directly or indirectly. Further, certain management system and/or application of the user devices may provide the environmental rules to the user device and allow the user device to adjust the environmental rules (e.g., according to feedback received by the user device). The user device may then directly communicate such modified environmental rules to one or more secondary devices, either through instructions from the management system and/or application of the user device that causes the user device to communicatively connect to the one or more secondary devices or through pre-existing connections between the user device and the secondary devices. Such a configuration may allow for direct user or user device modification of the rules, increasing customization, decreasing privacy fears (e.g., management system and/or application of the user device may not receive feedback data from the user at all and feedback and adjustment may be exclusively performed by the user's own device), and/or decreasing processing requirements of the management system and/or application of the user device as modifications to the environmental are performed by the user device.

In certain such embodiments, the user device and/or other devices may store its own modification table to the environmental rules based on user preferences. The management system and/or application of the user device may thus store a basic rule set common to all devices, and the rule set may be communicated to the user device and/or other devices for modification before environmental parameters are adjusted.

After the secondary device receives the adjusted environmental rules, the secondary device may then affect the environment around the user or user device according to the environmental rules in block 460. From blocks 460 and 462, the technique may then return to block 452 to perform continuously monitoring of feedback to allow for an optimal user experience.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
   a non-transitory memory; and
   one or more hardware processors coupled to the non-transitory memory and configured to read instructions from the non-transitory memory to cause the system to perform operations comprising:
   receiving interaction data indicating a user interaction with a merchant;
   determining, from the interaction data, an identity of the merchant and a product associated with the user interaction;

receiving, in response to the receiving the interaction data, secondary device data identifying a secondary device located in an area within a certain distance of a user device;

automatically determining, with a rules engine, an environmental rule based on the merchant and the product; and communicating the environmental rule to the secondary device to cause the secondary device to adjust a physical environment of the area within the certain distance of the user device.

2. The system of claim 1, wherein the product is a first product, the rules engine is configured to store a first environmental rule associated with the first product and a second environmental rule associated with a second product, and wherein the automatically determining the environmental rule comprises selecting the first environmental rule based on determining that the user interaction is associated with the first product.

3. The system of claim 1, wherein the user interaction comprises browsing a merchant website.

4. The system of claim 1, wherein the environmental rule comprises one or more rules for providing lighting, providing sound, or providing a scent.

5. The system of claim 1, wherein the environmental rule comprises a rule for providing a sound and the operations further comprise:

receiving, after the communicating the environmental rule, microphone data;

adjusting, based on the microphone data, the environmental rule; and communicating the adjusted environmental rule to the secondary device.

6. The system of claim 1, wherein the environmental rule is a first environmental rule, wherein the secondary device is a first secondary device, and wherein the operations further comprise:

receiving updated secondary device data identifying a second secondary device located in the area within the certain distance of the user device;

automatically determining, with the rules engine, a second environmental rule based on the merchant and the product; and communicating, to the second secondary device, the second environmental rule.

7. The system of claim 1, wherein the secondary device data comprises device type data, and wherein the operations further comprise:

automatically determining, based on the device type data, a device type for the secondary device, wherein the automatically determining the environmental rule is further based on the determined device type.

8. The system of claim 1, wherein the operations further comprise:

determining a time of day, wherein the environmental rule comprises a first environmental rule associated with a first time of day and a second environmental rule associated with a second time of day, and wherein the automatically determining the environmental rule comprises selecting the first environmental rule or the second environmental rule based on the time of day.

9. A method comprising:

receiving, with a user device, data indicating a user interaction with a secondary device of a service provider;

determining, from the data, that the secondary device is located in an area within a certain distance of the user device;

determining, from the data, an identity of the service provider and a product associated with the user interaction;

communicating an environmental rule associated with the service provider and the product to cause the secondary device to adjust a physical parameter of the area within the certain distance of the user device;

receiving, in response to the communicating the environmental rule, feedback data indicating a user reaction to the adjustment of the physical parameter; and updating the environmental rule based on the feedback data.

10. The method of claim 9, wherein the feedback data comprises microphone data, and wherein the method further comprises:

communicating the updated environmental rule to the secondary device.

11. The method of claim 9, wherein the feedback data comprises data indicating a user interaction with a feedback screen shown on a display of the user device.

12. The method of claim 9, wherein the environmental rule comprises a first environmental rule set and a second environmental rule set, and wherein the method further comprises:

determining a presence of a plurality of secondary devices located in the area within the certain distance of the user device;

determining a device type for each of the plurality of secondary devices; and selecting the first environmental rule set based on the device types of the plurality of secondary devices, wherein the communicating the environmental rule comprises communicating at least portions of the first environmental rule set to each of the secondary devices.

13. The method of claim 12, further comprising:

determining, after the determining the presence of the plurality of secondary devices, an absence of at least one of the plurality of the secondary devices in the area within the certain distance of the user device;

selecting the second environmental rule set in response to the determining the absence of the at least one of the plurality of secondary devices; and communicating at least portions of the second environmental rule set to each remaining secondary device.

14. A non-transitory machine-readable medium having stored thereon machine-readable instructions executable to cause a machine to perform operations comprising:

receiving an indication that a user is interested in or has purchased a product;

receiving, from a first device, proximity data indicating that a user device is located in an area within a certain distance of the first device, wherein the area is associated with the product;

receiving, from the user device, identity data;

automatically determining, from the identity data, that the user device is associated with the user;

automatically determining, an operational rule for the first device based on the indication and the determination that the user device is associated with the user;

communicating instructions to one or more of the user device or the first device to cause the user device or the first device to communicatively connect with each other;

communicating the operational rule to the user device, wherein the operational rule is configured to be adjustable by the user device and configured to be communicated by the user device to the first device; and communicating the operational rule to the first device to cause the first device to adjust a physical environment of the area within the certain distance of the first device.

15. The non-transitory machine-readable medium of claim 14, wherein the operational rule comprises a first operational rule and a second operational rule, and wherein the operations further comprise:

determining a global position of the area; and selecting one of the first operational rule or the second operational rule based on the global position of the area, wherein the operational rule is determined based on the selection of one of the first operational rule or the second operational rule.

16. The non-transitory machine-readable medium of claim 14, wherein the area is a public or semi-public space.

17. The non-transitory machine-readable medium of claim 14, wherein the operations further comprise:

receiving, after the communicating the operational rule and within a first time period, feedback data;

adjusting, based on the feedback data, the operational rule; and communicating the adjusted operational rule to the first device.

18. The non-transitory machine-readable medium of claim 17, wherein the feedback data is received from the first device.

19. The non-transitory machine-readable medium of claim 14, wherein the operational rule is pre-determined based on previously obtained feedback data.

20. The non-transitory machine-readable medium of claim 14, wherein the operations further comprise:

receiving, after the communicating the operational rule and within a first time period, feedback data; and adjusting, based on the feedback data, a shape or a size of the area within the certain distance of the first device.

* * * * *